United States Patent [19]

Yamashita

[11] 4,447,067

[45] May 8, 1984

[54] AUTOMOBILE FENDER PROTECTOR FORMED OF SYNTHETIC RESIN

[76] Inventor: Toshio Yamashita, No. 2914-20, Iiyama, Atsugi City, Japan

[21] Appl. No.: 306,627

[22] Filed: Sep. 28, 1981

[30] Foreign Application Priority Data

Oct. 6, 1980 [JP] Japan .......................... 55-142464[U]

[51] Int. Cl.³ .............................................. B62D 25/16
[52] U.S. Cl. .................................................. 280/153 R
[58] Field of Search ............ 280/152 R, 152.2, 153 R, 280/153 A, 154.5 R, 153 B

[56] References Cited

U.S. PATENT DOCUMENTS

| 2,771,304 | 11/1956 | La Pere | 280/152 R |
| 4,138,129 | 2/1979 | Morris | 280/153 R X |
| 4,169,608 | 10/1979 | Logan | 280/153 R |
| 4,174,850 | 11/1979 | Hart | 280/153 R |
| 4,215,873 | 8/1980 | Price | 280/153 R |

Primary Examiner—Joseph F. Peters, Jr.
Assistant Examiner—Michael Mar
Attorney, Agent, or Firm—James Creighton Wray

[57] ABSTRACT

An automobile fender protector to be attached to a fender panel for protection against splashing of mud. Essentially, the fender protector is a one-piece member which is formed of a synthetic resin and has a protector body in the form of an elongate plate curved correspondingly to a semicircular wheel-receiving opening of the fender panel, a mud guard portion as a rearward and downward extension of the protector body, and a fender molding portion in the form of a vertical wall extending upward from the outboard circumferential edge of the protector body. This fender protector may has an ornamental molding fitted into a circumferential slot in the outer surface of the fender molding portion.

16 Claims, 6 Drawing Figures

PRIOR ART

AUTOMOBILE FENDER PROTECTOR FORMED OF SYNTHETIC RESIN

BACKGROUND OF THE INVENTION

1. Field of the Invention

The present invention relates to a fender protector which is fundamentally in the form of a semicircularly curved plate and is to be attached to a fender panel of an automobile so as to extend inboard of a wheel-receiving opening of the fender panel, and more particularly to a fender protector of such a type formed of a synthetic resin.

2. Description of the Prior Art

In some automobiles, a fender protector fundamentally in the form of a semicircularly curved plate is attached to a fender panel of the automobile so as to extend inboard of a wheel-receiving opening of the fender panel. The main purpose of this fender protector is the protection against splashing of mud, but the fender protector also serves the function of reinforcing the fender panel.

A conventional fender protector of the above-mentioned type is made up of a protector body which is in the form of an elongate plate curved semicircularly and correspondingly to the wheel-receiving opening of the fender panel and is fixed to the fender panel, a mud guard which is a curved plate fixed to the rear end of the protector body so as to extend downward and rearward, and a fender molding which is an angled and semicircularly shaped plate fixed to the outboard circumferential edge of the protector body. The fender molding has an ornamental effect and, besides, reinforces the protector body. The protector body is formed of a metal, whereas the mud guard is formed of a rubber and the fender molding is formed of a synthetic resin.

Such a fender protector may seem to be a simple and easily produced article. Actually, however, this article requires relatively high production cost when attachment of this article to the fender panel is also taken into consideration. As a first reason, each of the protector body, mud guard and fender molding requires a separate metal die for forming thereof. The assembly of the fender protector and its attachment to the fender panel are troublesome and require many man-hours. That is, the protector body is attached to the fender panel after assembly of the car body including the fender panel, using screws or the like. It is necessary to form holes for the screws through the protector body and the fender panel at this stage, and the assembly of the fender protector and its attachment to the car body are carried out simultaneously. For this work, not only fastening parts such as screws but also some auxiliary parts and materials are necessary, so that much time and labor are necessary for management of such parts and materials. Furthermore, the protector body is liable to rust from the circumferences of the aforementioned holes.

SUMMARY OF THE INVENTION

It is a primary object of the invention to provide a fender protector for attachment to a fender panel of an automobile in the manner as described hereinbefore, which protector is low in production cost and has no possibility of rusting.

It is another object of the invention to provide such a fender protector which is high in the ornamental effect.

A fundamental feature of a fender protector according to the invention is that a protector body, a mud guard portion and a fender molding portion are all formed of a synthetic resin so as to constitute a one-piece member.

More definitely, a fender protector according to the invention to be attached to a fender panel of an automobile for the protection against splashing of mud has a one-piece member formed of a synthetic resin as an essential element. This one-piece member consists of a protector body which is in the form of an elongate plate curved correspondingly to a generally semicircular wheel-receiving opening formed in the fender panel and has approximately the same circumferential length as the wheel-receiving opening, a mud guard portion which is generally in the form of a curved plate extending rearwardly and downwardly from the rear end of the protector body and a fender molding portion which is generally in the form of a vertical wall projecting upwardly from the outboard edge of the protector body over substantially the entire circumferential length of the protector body. The fender protector is shaped such that, when the fender protector is attached to the fender panel so as to make the protector body lie inboard of the wheel-receiving opening and over the wheel, the fender molding portion covers the outboard side of a generally semicircular portion of the fender panel along the wheel-receiving opening.

The aforementioned one-piece member requires only one metal die set for forming thereof and can entirely be formed in one process. If holes for attachment of the fender protector to the car body are necessary, such holes can also be formed at the time of forming of the one-piece member. This fender protector can be easily attached to the car body by using an adhesive and/or only a small number of screws or the like. Therefore, the production cost of this fender protector is far lower than the conventional fender protectors. Besides, there is no possibility of rusting of this fender protector.

Preferably, the fender molding portion is formed in its outboard side surface with a semicircularly elongate slot, and an ornamental molding is fitted in this slot.

DESCRIPTION OF THE PREFERRED EMBODIMENTS

Figure 1:
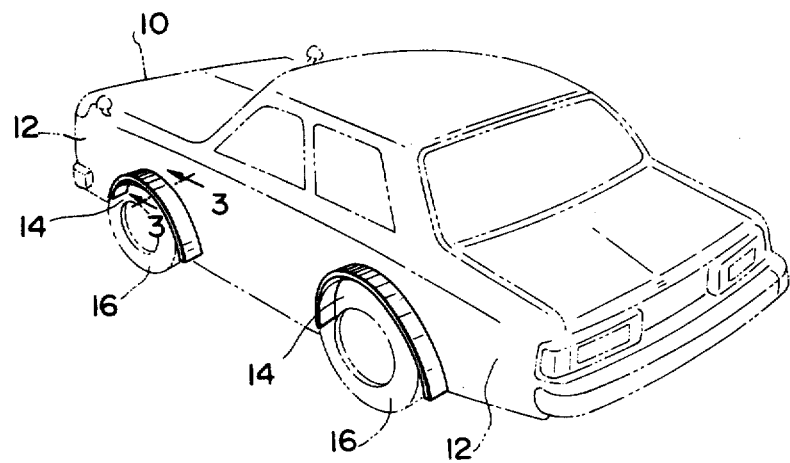
FIG. 1 is a perspective view of fender protectors attached to an automobile.

In FIG. 1, each of front and rear fender panels 12 of an automobile 10 is formed with a generally semicircular wheel-receiving opening 14 to allow attachment and detachment of a wheel 16.

Prior to the description of preferred embodiments of the invention, a typical example of conventional fender protectors will be described with reference to FIGS. 2 and 3 in order to aid understanding of the invention.

Figure 2:
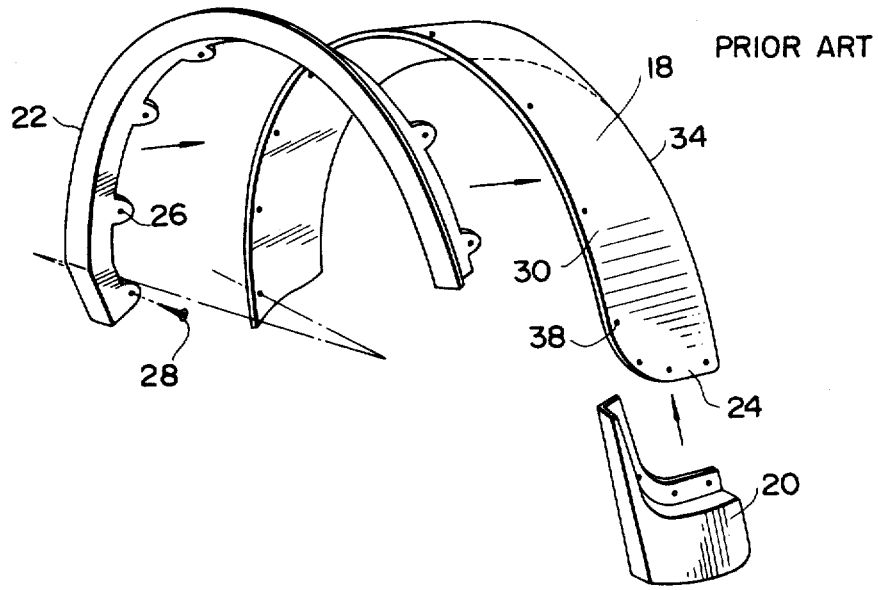
FIG. 2 is a perspective and exploded view of a conventional fender protector.

The conventional fender protector of FIG. 2 is made up of a protector body 18, a mud guard 20 and a fender molding 22 all of which are formed separately from each other. The protector body 18 is formed of a metal sheet and has a generally semicylindrical shape corresponding to the wheel-receiving opening 14 of the fender panel 12. The mud guard 20 is formed of rubber and has the shape of a curved sheet extending from the rear end 24 of the protector body 18 downwardly and rearwardly with respect to the wheel-receiving opening 14 of the fender panel 12. The fender molding 22 is formed of a synthetic resin and has the shape of a generally semicircularly curved frame having substantially the same circumferential length as the protector body 18. This fender molding 22 is circumferentially flanged and formed with holes 26 for screws 28 to be used in assembly of the fender protector. The fender molding 22 ornaments and reinforces the protector body 18.

This conventional fender protector is attached to the automobile 10 in the following manner.

Figure 3:
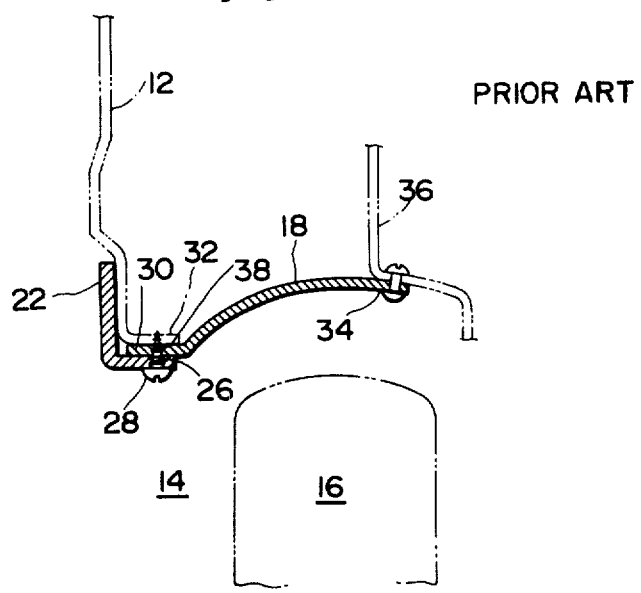
FIG. 3 is an enlarged sectional view taken along the line 3—3 of FIG. 1.

As shown in FIG. 3, the protector body 18 is fixed in its outboard circumferential edge region 30 to a horizontally folded and generally semicircular edge region 32 of the fender panel 12 and in its inboard circumferential edge region 34 to a suitable member 36 of the car body by screws or the like after assembly of these parts of the car body. Thereafter, the fender molding 22 is attached provisionally to the protector body 18 by using double-faced adhesive tape for example. In this state, holes 38 are drilled, in alignment with the holes 26 of the fender molding 22, through the outboard circumferential edge region 30 of the protector body 18 and the aforementioned edge region 32 of the fender panel 12. By using these holes 26 and 38, the fender molding 22 is firmly fixed to the protector body 18 and the fender panel 12. By a similar procedure, the mud guard 20 is attached and fixed to the rear end 24 of the protector body 18.

Because of the above described construction and the manner of assembling and attachment, this fender protector offers inconveniences of the automobile manufacturer and becomes costly as explained hereinbefore.

Figure 4:
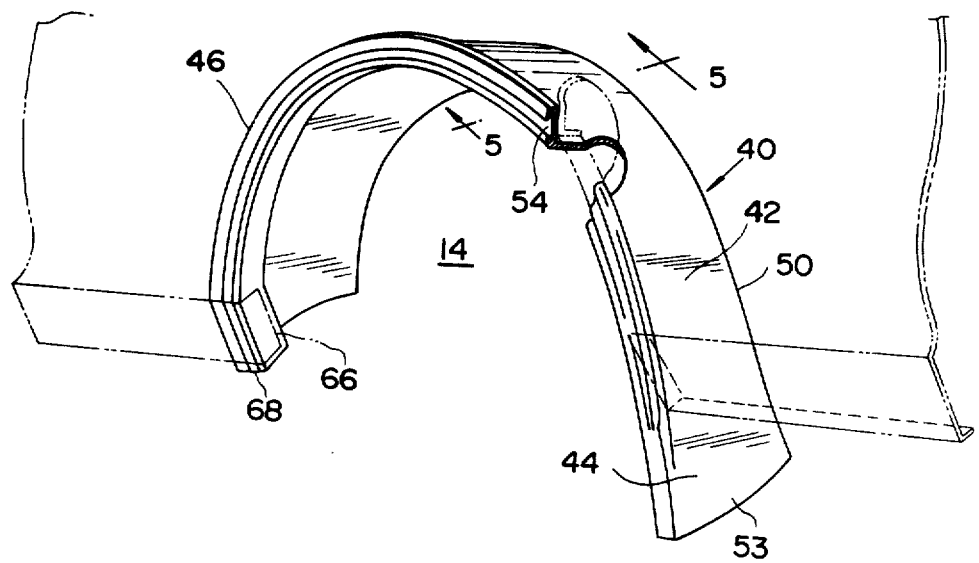
FIG. 4 is a perspective view of a fender protector as a preferred embodiment of the invention.
Figure 5:
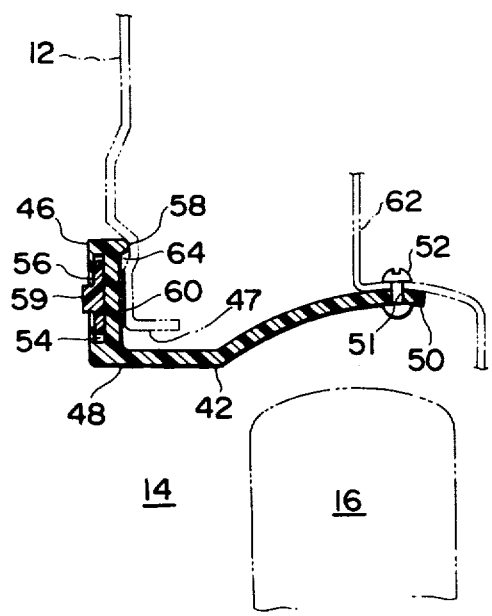
FIG. 5 is an enlarged sectional view taken along the line 5—5 of FIG. 4.

FIGS. 4 and 5 show a fender protector as a preferred embodiment of the invention. Fundamentally, this fender protector is a one-piece member 40, as shown in FIG. 4, which is formed of a synthetic resin. The kind of the synthetic resin is not particularly limited, but synthetic resins excellent in mechanical strength, toughness, resiliency, weather resistance and formability are suited to this fender protector. Polypropylene and polycarbonate are preferred examples of suitable resins. This one-piece member 40 is formed usually by injection molding. This one-piece member 40 consists of a protector body 42, a mud guard portion 44 and a fender molding portion 46.

The protector body 42 has the shape of an elongate plate curved generally semicircularly and correspondingly to the generally semicircular periphery 47 of the wheel-receiving opening 14 of the fender panel 12 to have nearly the same circumferential length as the periphery 47 of the wheel-receiving opening 14. The lateral width of the protector body 42 is nearly equal to the distance between the fender panel 12 and the inboard side surface of the wheel 16. The protector body 42 may be substantially flat in cross section, but it is preferred to curve an inboard portion of the protector body 42 such that the lower side of this portion becomes concave as shown in FIG. 5. The thickness of the protector body 42 may be uniform over the entire area or may optionally be increased in its outboard circumferential edge region 48. In its inboard circumferential edge region 50, the protector body 42 is formed with holes 51, which are used for fixing the protector body 42 to a suitable part of the car body by screws 52 or the like, at the time of forming of the protector body 42.

The mud guard portion 44 is a curved plate contiguous to the protector body 42 and can be regarded as a rearward and downward extension of the body 42. The lateral width of the mud guard portion 44 may be uniform over its entire length, but it is rather desirable to broaden the width toward the rear end 53 of this portion 44. It is preferred to curve the mud guard portion 44 such that its lower side becomes concave.

The fender molding portion 46 can be regarded as a vertical wall projecting upwardly from the outboard circumferential edge region 48 of the protector body 42 over substantially the entire circumferential length of the body 42, so that this portion 46 has a generally semi-annular shape in a lateral view. The thickness of the fender molding portion 46 is somewhat thicker than the protector body 42. The height of the fender molding portion 46 is usually several centimeters. It is desirable to make a suitable surface-treatment to afford an attractive color to the outer surface of the fender molding portion 46.

In this embodiment, the fender molding portion 46 is formed in its outboard side surface with a T-slot 54 which extends circumferentially over substantially the entire length of this portion 46, and, as shown in FIG. 5, an ornamental molding 56 is fitted into this slot 54. On the inboard side, the fender molding portion 46 is formed at its upper edge with a circumferential and lateral flange-like projection 58.

The ornamental molding 56 is an elongate plate of a synthetic resin so formed as to fit into the T-slot 54 of the fender molding portion 46. That is, on the outboard side, this plate-like molding 56 is formed with a circumferential extending rib or ridge 59 in its central region. At least an outer surface of the ornamental molding 56 is coated with a luminous or lustrous coating film which affords an attractive appearance to the molding 56. A luminous coating film can be formed by application of a luminous paint. A lustrous coating film can be formed by application of a metallic paint, by plating or by vapor phase deposition of a metal. Besides the ornamental effect, the presence of the ornamental molding 56 is favorable for traffic safety.

As shown in FIG. 5, this fender protector is attached to the car body by bonding the inboard side surface of the fender molding portion 46 to the outboard side surface of the fender panel 12 by an adhesive 60 and by fixing the inboard circumferential edge region 50 of the protector body 42 to a suitable member 62 of the body of the automobile 10 by suitable fastening parts 52 such as screws, rivets or grommets using the holes 51. The projection 58 of the fender molding portion 46 enters a recess 64 formed in the outboard side surface of the fender panel 12 to thereby determine the position of the fender molding portion 46 with respect to the fender panel 12.

When a mud guard 66 is provided to the front and lower end of the generally semicircular periphery 47 of the wheel-receiving opening 14, a front end portion of the protector body 42 and a front end portion 68 of the fender molding portion 46 are shaped correspondingly to the mud guard 66 in order to conceal the mud guard 66.

The protector body 42 is positioned below the generally semicircular periphery 47 of the wheel-receiving opening 14 and over the wheel 16, and the mud guard portion 44 extends downwardly and rearwardly of the rear and lower end of the generally semicircular periphery 47 of the wheel-receiving opening 14, when the fender protector is attached to the car body.

The ornamental molding 56 can be replaced by an ornamental molding formed of a metal sheet in a shape similar to the ornamental molding 56. At least the outer surface of such a metal molding may be coated with a luminous or lustrous coating film formed by painting or plating.

Figure 6:
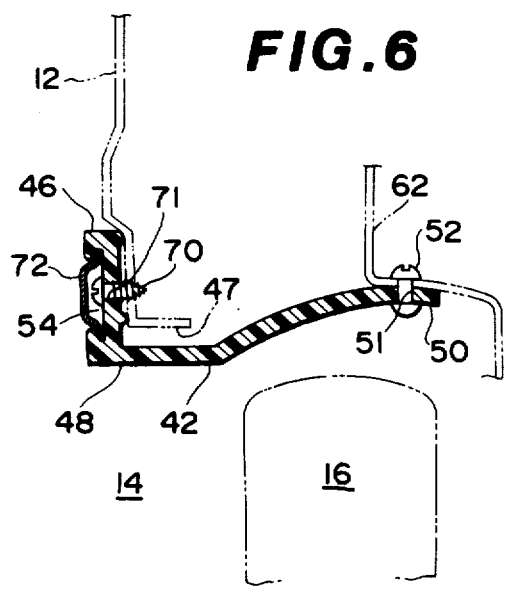
FIG. 6 shows a partial modification of the fender protector of FIGS. 4 and 5 in a sectional view similar to FIG. 5.

FIG. 6 shows another embodiment of fender protectors according to the invention. In this case, the fender molding portion 46 is fixed to the fender panel 12 by screws 70. The fender molding portion 46 is formed with holes 71 for the screws 70 at the time of forming of the fender protector. In place of the ornamental molding 56 in FIG. 5, an ornamental molding 72 formed of a metal sheet is received in the T-slot 54 of the fender molding portion 46 to conceal the heads of the screws 70. The ornamental molding 72 is generally semi-annular in plan view shape and dish-like in cross-section. At least the outer surface of the ornamental molding 72 may be coated with a luminous or lustrous coating film formed by painting or plating.

The ornamental molding 72 can be replaced by an ornamental molding which is formed of a synthetic resin and has the shape of a semi-annular plate with a groove on the inboard side to receives therein the heads of the screws 70.

It will be understood that the shape of each portion of the fender protectors of FIGS. 4 to 6 can variously be modified without deviating from the fundamental concept of the invention.

What is claimed is:

1. In a fender construction associated with a fender panel of an automobile for protection against splashing of mud or the like, the fender panel being formed with a generally semicircular wheel-receiving opening,
   a combination comprising:
   a fender protector of one-piece synthetic resin article, which comprises a protector body which is in the form of an elongate plate curved correspondingly to said generally semicircular wheel-receiving opening of said fender panel and having approximately the same circumferential length as said wheel-receiving opening, a mud guard portion which is generally in the form of a curved plate extending rearwardly and downwardly from the rear end of said protector body, and a fender molding portion which is generally in the form of a vertical wall projecting upwardly from the outboard edge of said projector body over substantially the entire circumferential length of said body, said fender molding portion being formed with a circumferentially extending slot which is generally T-shaped in cross section, said protector body extending inwardly of said fender panel substantially the width of the automobile wheel, means for securing the vertical wall of said fender molding portion to said fender panel and means for securing an inner edge of said protector body to a body member of the automobile; and
   an ornamental molding which is generally in the form of an elongate plate so shaped as to fit into said T-shaped slot and is lockably received in said slot, said fender protector being arranged and constructed so that when said protector is attached to said fender panel so as to make said protector body lie inboard of said wheel-receiving opening and over the wheel, said fender molding portion covers the outboard side of a generally semicircular portion of said fender panel along said wheel-receiving opening.

2. A fender protector according to claim 1, wherein said synthetic resin is polypropylene.

3. A fender protector according to claim 1, wherein said one-piece member is formed by injection molding of said synthetic resin.

4. A fender protector according to claim 1, wherein said ornamental molding is formed of a synthetic resin.

5. A fender protector according to claim 1, wherein said ornamental molding is formed of a metal sheet.

6. A fender protector according to claim 4 or 5, wherein at least an outer surface of said ornamental molding is coated with a luminous coating film.

7. A fender protector according to claim 6, wherein said coating film is formed by application of a luminous paint.

8. A fender protector according to claim 4 or 5, wherein at least an outer surface of said ornamental molding is coated with a lustrous coating film.

9. A fender protector according to claim 8, wherein said coating film is formed by application of a metallic paint.

10. A fender protector according to claim 8, wherein said coating film is formed by plating.

11. A fender protector according to claim 4, wherein at least an outer surface of said ornamental molding is coated with a lustrous coating film formed by vapor phase deposition of a metal.

12. A fender protector according to claim 4, wherein said ornamental molding is formed on its outboard side with a circumferentially extending rib in its central region.

13. A fender protector according to claim 5, wherein said ornamental molding is generally dish-like in cross section.

14. A fender protector according to claim 1, wherein an inboard region of said protector body is cross-sectionally curved so as to become concave on the lower side.

15. A fender protector according to claim 1, wherein said fender molding portion is formed with holes for attachment of the fender protector to said fender panel by using fastening means.

16. A fender protector according to claim 1 or 14, wherein said protector body is formed with holes in an inboard region thereof for fixing of the fender protector to a part of the body of the automobile by using fastening means.

* * * * *